Oct. 7, 1947.　　　F. B. YINGLING　　　2,428,602
CONNECTING ROD ASSEMBLY
Filed Jan. 12, 1944
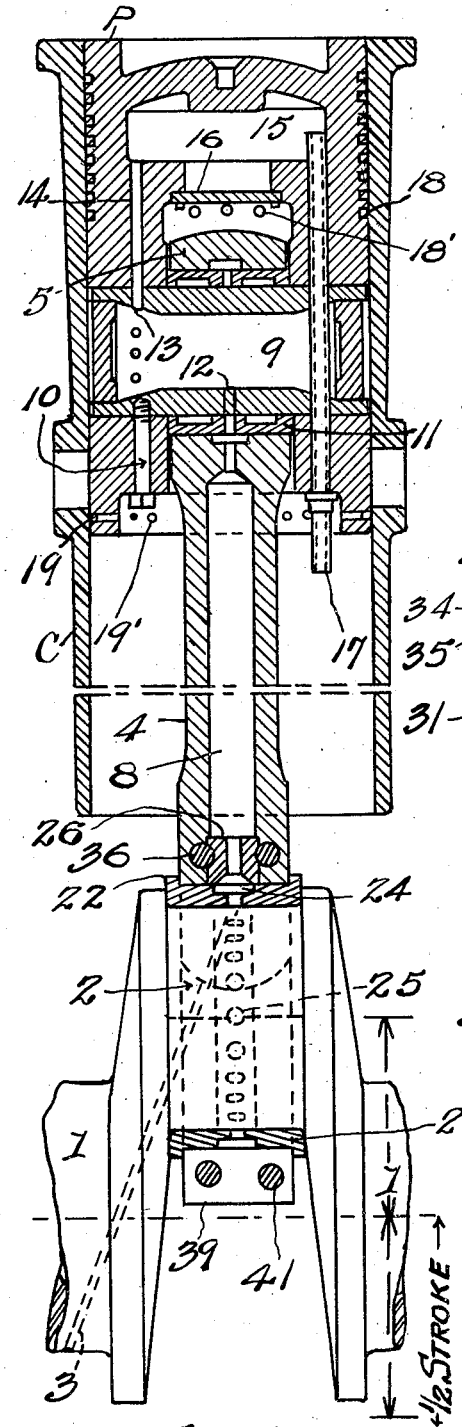
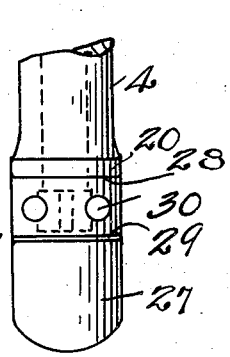
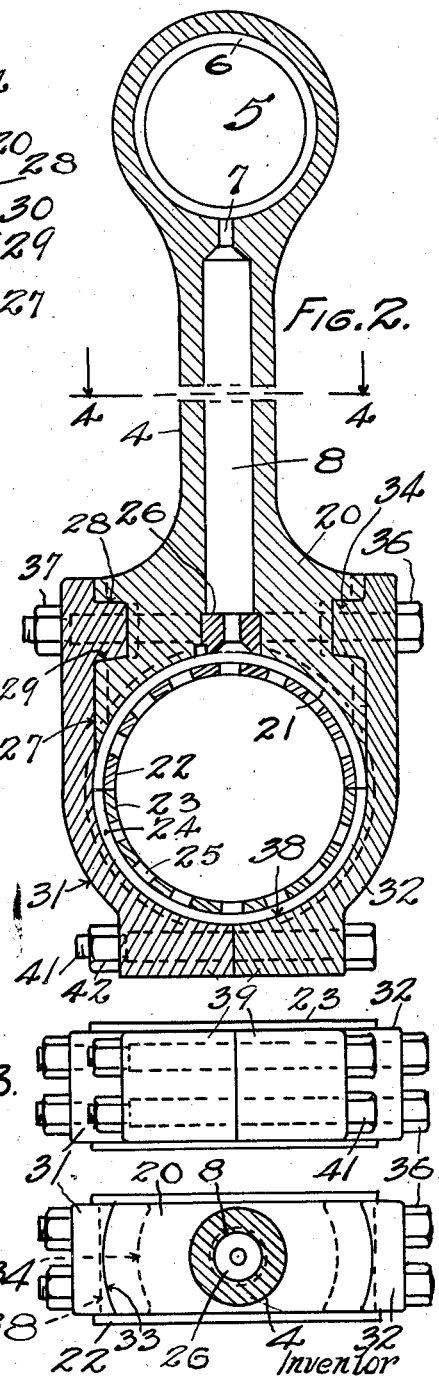
Inventor
FRANK B. YINGLING
By Charles K. Davies
Atty.

Patented Oct. 7, 1947

2,428,602

UNITED STATES PATENT OFFICE 2,428,602

CONNECTING ROD ASSEMBLY

Frank B. Yingling, Hamilton, Ohio

Application January 12, 1944, Serial No. 517,943

3 Claims. (Cl. 74—579)

1

The connecting rod assembly forming the subject matter of the present invention is a unit adapted for use in multi-cylinder, high power, and heavy duty, internal combustion engines of the two cycle type, and this invention is a continuation in part of my pending application Ser. No. 350,750, filed August 3, 1940, for Diesel engines. The present invention is also a continuation in part of the subject matter of my pending application for patent Ser. No. 392,385, filed May 7, 1941, Connecting rod assembly.

In the first mentioned above application a compactly arranged engine is shown with maximum dimensions for specific parts making available a heavy duty, high power engine that occupies a minimum of space. In the heavy engine, in order to compensate for the high bearing pressure on the crankshaft, I utilize large-diameter, main journal bearings approximating the diameter of the engine cylinder, and I also employ large-size crank-pins or journals in the crankshaft, which pins or journals are slightly smaller in diameter than the cylinder bore of the engine. Under these conditions, to reduce the overall length of the cylinder block and engine frame I arrange the "in line" cylinders spaced apart approximately one and a half times the diameter of adjoining cylinders.

As disclosed in the present invention, and due to the construction and arrangement of the parts forming the bearing for the connecting rod on the crankshaft, I am enabled to employ not only comparatively large heavy duty crank pins or journals for the connecting rod, but the elements used in the connecting rod bearing are also of increased size and strength to compensate for the heavy duty performance of the engine.

Notwithstanding the maximum dimensions of the various parts forming the connecting rod assembly, the connecting rod bearing parts may with facility be assembled and fastened about the crank pins or journals of the crankshaft, and with equal facility the parts may be taken down when required, for instance in order to replace worn journal bushings of the bearings.

In assembling the bearing parts, and in dismounting the bearing, the connecting rod assembly including the piston and the connecting rod, are passed through the complementary cylinder, thereby obviating the necessity of taking down other parts of the engine. The largest element of the connecting rod bearing, which is a large integral bearing head at the inner end of the connecting rod, may thus be passed longitudinally through a cylinder without danger of scratching or otherwise marring the cylinder bore or lining of the cylinder.

The connecting rod bearing comprises a minimum number of parts which are simple in construction thus facilitating their manufacture, and these parts may be conveniently bolted together to assure a rigid, compact, and durable enclosure for the precision bushing interposed between the bearing and the crank pin or crankshaft journal.

In carrying out my invention I preferably utilize a tubular connecting rod, which is finished to close dimensions and equalized in weight, and lubricating means are employed for the bearings and other operating parts, as well as cooling oil for the interior of the piston and parts of the connecting rod assembly, to insure maximum heat conductivity from the operating parts of the assembly. For the purposes of lubrication of parts of the assembly, oil is delivered from the crank case of the engine through collecting ducts in the crankshaft, and thence to the connecting rod and piston, and returned through telescoping pipes or tubes, to the sump in the crank case, the usual pump being employed for placing the oil under pressure and circulating the oil to carry off the heat from the operating parts.

In the accompanying drawings I have illustrated one complete example of the physical embodiment of my invention wherein the parts are combined and arranged according to one mode I have thus far devised for the practical application of the principles of my invention. It will be understood that changes and alterations may be made in these exemplifying drawings within the scope of my appended claims without departing from the principles of my invention.

Figure 1 is a detailed sectional view of a bearing assembly involving the improvements of my invention, showing a portion of the crankshaft of an engine, together with a portion of a cylinder in which the piston of the assembly reciprocates.

Figure 2 is a detail sectional view of the connecting rod detached from the piston and crankshaft, the plane of the view being at right angles to the plane of the section in Fig. 1.

Figure 3 is a bottom view, looking up in Fig. 2, showing the bearing yoke, or straps of the bearing on the crankshaft journal.

Figure 4 is a view at line 4—4 of Fig. 2 showing the tubular rod, its integral head, and the sectional yoke.

Figure 5 is a view looking either to the right or to the left in Figure 2, showing the enlarged bearing head at the inner or crankshaft end of the connecting rod.

Figure 6 is an inner face view of either of the two straps forming the sectional yoke.

In order that the general arrangement and utility of parts may readily be understood, I have shown in the assembly view Fig. 1 a portion of an engine cylinder C, and also portions of the crankshaft including main bearing journals 1, 1, approximating in diameter the size of the cylinder bore, while the slightly smaller crank-pin or journal 2 for the inner end of the connecting rod is of less diameter than the main journal bearings 1, 1. Oil under pressure is forced by a suitable pump from the interior of the crank case, in which the bearings are mounted, into and through oil ducts in bearing caps of the shaft and thence through duct 3 of the crankshaft (dotted lines Fig. 1) for lubrication, and for piston cooling purposes.

The tubular connecting rod or pitman 4 is preferably of forged steel, finished all over to insure close dimensions, and fashioned at its outer smaller end with an integral bearing boss or box 5 having an interior annular oil groove 6, and a radial port 7 opening into the hollow bore 8 of the connecting rod 4. The connecting rod is coupled with the piston P through the non-rotatable wrist pin 9 which is transversely mounted in the hollow piston and secured by set bolt 10 threaded into a hole in the cylindrical wall of the fixed wrist pin. Between the wrist pin and the bearing boss 5 a ported roller bearing 11 is interposed, and the central ports in the roller bearing permit flow through the roller bearing of oil from port 7 and thence through an inlet port 12 to the interior of the tubular or cylindrical wrist pin.

An oil port 13 is also indicated in Fig. 1 through the wall of the wrist pin, and this port registers with an oil duct 14 that extends longitudinally of the piston P from the wrist pin toward the outer end of the piston. Beneath its head, the hollow piston is fashioned with an oil chamber 15 which is closed by a plate 16 extending transversely of the piston and fastened therein in suitable manner, and it will be apparent that oil passing from the interior of the tubular wrist pin through outlet port 13 and duct 14 will flow into the oil chamber 15.

An outlet pipe from the oil chamber 15 is shown at 17, which pipe is mounted within the piston with its inlet end located in the chamber 15. The lower end of the pipe 17 projects from the piston a suitable distance to cooperate with a telescoping, stationary pipe section (not shown) by means of which the oil is returned to the crank case portion of the engine, where it is again picked up and circulated by the oil pump.

In Fig. 1, in addition to the usual piston rings, it will be seen that two spaced oil-scraper rings 18 and 18' are mounted in exterior annular grooves of the piston, and ports 19, 19' from these grooves extend radially and inwardly to the interior of the hollow piston, for disposing of excess oil that may be scraped from the interior cylinder wall.

The inner or crank end of the tubular connecting rod is fashioned with an enlarged integral head 20 preferably having a semicircular concave bearing face 21 that fits over a major portion of a two-piece precision bearing-ring or sectional bushing 22-23, which is mounted on the crank pin 2 of the crankshaft. The head, in combination with the bearing ring, provides a direct bearing of ample size and strength to receive and transmit all the thrust or pressure from the piston directly to the crankshaft journal. The head conforms in size and/or shape to the dimensions of the cylinder C so that it may safely pass therethrough without danger of damage to the cylinder bore.

For lubricating the bearing, the sectional ring 22-23, which may readily be replaced when worn, is fashioned with an exterior annular oil-groove 24 and circumferentially spaced radial ports 25 receiving oil from the duct 3 of the crankshaft. To provide a metered or regulated supply of oil to the interior bore 8 of the tubular rod 4, the oil also flows upwardly from the annular groove 24 through a restricted port in an oil plug 26 that is seated and fixed in a recess of the head 20.

The head 20, which forms a major portion of the connecting rod bearing, is fashioned with two opposed shoulders having suitable exterior attaching faces that may be varied in use in adapting them to different conditions. In the drawings these faces 27, 27, are shown as arcuate and convex, forming arcs of a circle struck from the axial center of the connecting rod and having a diameter slightly less than the interior bore of the cylinder C. These rounded faces of the head assist in maintaining alinement of the bearing, and they permit and facilitate insertion of the head-end of the rod down through the cylinder before assembling the bearing, and they also permit and facilitate withdrawal of the head up through the cylinder after dismounting the bearing from the journal.

The enlarged integral head cooperates with a bearing yoke that is made up of two sections which may readily be assembled about the journal, or which may with equal convenience be dismantled from the crankshaft when necessary. For this purpose the head is recessed to form sockets in the two opposed rounded faces, the upper wall 28 of each socket having a straight surface, and the lower wall 29 of each socket having an inclined surface. As best seen in Fig. 5 a pair of parallel bolt holes 30 are extended through the head with their opposite ends terminating at the inner walls of the sockets, and these inner walls of the sockets, as indicated may be in planes concentric with the rounded faces 27, 27 on the opposite shoulders of the head.

The sectional U-shaped bearing yoke includes two duplicate spaced arms 31 and 32 having concave rounded faces 33 for frictional contact with the convex faces 27 of the shoulders on the head; and each arm is fashioned with an integral tension lug 34 that conforms to and fits in a socket of the head. By the formation in the head of the socket walls 28, 29 having straight upper surfaces and inclined or beveled surfaces respectively, together with the use of the tension lugs 34, 34, of the yoke sections conforming to these walls of the sockets, these interengaging parts co-act to withstand pressure through the head to the bearing ring 22—23. Each of these arms is also fashioned with a pair of holes 35 that register with the complementary holes 30 of the head to receive bolts 36 that extend through the head and the enlarged parts of the arms, and are provided with fastening nuts 37.

The arms 31, 32, are fashioned with curved portions having curved surfaces 38, 38, which together form a semi-circular bearing face at the opposite side of the bearing ring and opposed to the face 21 of the head 20. The arms terminate in complementary abutting blocks 39, 39 having registering holes 40 to receive bolts 41, and nuts 42 on these bolts cooperate with nuts 37 and bolts 36, in clamping the bearing on the journal.

The extreme width of the head between its curved shoulders provides ample metal to permit location of the opposed sockets closely adjacent to the journal of the bearing, and the presence of the lugs or bosses in these sockets not only strengthens the arms of the yoke, but in addition they provide ample and substantial support for the bolts 36. Due to this arrangement of parts a maximum clamping action is attained by bolts 36 and their nuts 37 in close proximity to the journal at one side of the bearing; and a similar clamping action is provided at the opposite side of the bearing by the bolts 41 and nuts 42. This close proximity of the clamping bolts to the journal insures a rigid and solid bearing structure to withstand pressure through the connecting rod against the bearing. By the use of the complementary inclined or tapered faces or walls of the lugs and sockets, as the bolts are tightened, the precision bushing or sectional bearing ring is drawn up into place around the journal and clamped solidly in place by the two arms or straps of the U-shaped yoke.

Preferably the assembly is machined or bored out as a unit, to receive the sectional bearing ring, and when the bearing is assembled the clamping bolts 41 and nuts 42 tie the yoke sections solidly about the bearing ring, and, together with bolts 36 and nuts 37 the yoke sections and the head 20 are rigidly joined as a substantial unitary structure. The beveled or inclined faces of the complementary sockets and lugs cooperate in drawing up the bearing ring on the journal in a rigid assembly of the parts.

The yoke sections are readily removable for access to the replaceable bearing ring, and when necessary these parts may be disjointed from the bearing, to replace a worn bearing ring and maintain the bearing in efficient condition, and eliminate all necessity for any adjustment of parts.

The connecting rod assembly of my invention is especially useful in heavy duty Diesel engines where, in order to reduce to a minimum the overall length of the engine, the centers of the alined adjoining cylinders are spaced apart approximately one and a half times the diameter of a cylinder. Due to this compact arrangement of parts there is not sufficient space between the inner ends of the cylinders and the crank shaft for mounting and dismounting the bearings through the inner ends of the cylinders.

The utilization of my connecting rod assembly makes possible the use of maximum sizes in the journals of the crankshaft and in the journal bearings, and at the same time permits and facilitates the mounting and dismounting of the connecting rod assembly through the upper or outer end of the cylinder, after the cylinder head has been removed.

While I have shown one complete embodiment of my invention, it will be understood that suitable modifications and changes may be made in the invention and its exemplifying drawings within the scope of the specification and claims without departing from the principles of the invention.

For instance, angular, or rectangular shoulders and faces may be utilized on the head in lieu of the rounded faces illustrated; grooves and lugs may be employed in the construction of parts to reduce material and the cost of manufacture; and other similar changes may be made when desirable, and yet attain the objects of my invention as set forth.

Having thus fully described my invention, what I claim as new and desire to secure by Letters Patent is:

1. The combination with a connecting rod having a bearing head, and a bearing yoke comprising separable sections and forming an extension of the head, of a removable bearing ring between said head and yoke, co-acting means on the opposite sides of the head and on the yoke-sections for causing relative movement of the yoke sections to draw the ring in line with the longitudinal axis of the rod, a clamp bolt passing through the head and yoke-sections and a nut on the bolt for causing said relative movement, and means for clamping the yoke sections against the ring.

2. The combination with a connecting rod having a head and semi-circular bearing face, and arcuate convex shoulders at opposite sides of the head, of a U-shaped sectional bearing yoke having a semi-circular bearing face and arcuate faces complementary to said shoulders, a removable bearing ring mounted within the head and yoke, said yoke-sections each having a lug seated in a socket of a shoulder, each said lug having a bevel face frictionally engaging a complementary wall of a socket tending to draw the bearing ring into place, a pair of bolts passing through the head, lugs and yoke-sections at one side of the bearing, and means at the other side of bearing for clamping the yoke-sections against the bearing ring.

3. The combination with a connecting rod having a head and semi-circular bearing face, of a U-shape sectional bearing yoke having a complementary semi-circular bearing face, a removable bearing ring mounted within the head and yoke, said yoke having opposed lugs seated in sockets of the head, each said lug having a lower bevel face and an upper straight face frictionally engaging complementary walls of the sockets, a pair of bolts passing through the head, lugs, and bolt sections at one side of the bearing, and a pair of bolts at the opposite side of the bearing for clamping the yoke sections against the bearing ring.

FRANK B. YINGLING.

REFERENCES CITED

The following references are of record in the file of this patent:

UNITED STATES PATENTS

| Number | Name | Date |
| --- | --- | --- |
| 2,033,601 | Wohanka | Mar. 10, 1936 |
| 1,239,543 | Tipton | Sept. 11, 1917 |
| 1,584,897 | Skinner | May 18, 1926 |
| 1,434,143 | Patterson, et al. | Oct. 31, 1922 |
| 1,208,263 | Woodard | Dec. 12, 1916 |

FOREIGN PATENTS

| Number | Country | Date |
| --- | --- | --- |
| 446,728 | Great Britain | May 5, 1936 |
| 512,776 | Great Britain | Dec. 6, 1937 |